(12) United States Patent
Hirose

(10) Patent No.: US 8,210,977 B2
(45) Date of Patent: Jul. 3, 2012

(54) HYDRAULIC CONTROL DEVICE OF AUTOMATIC TRANSMISSION

(75) Inventor: Ikuo Hirose, Fujinomiya (JP)

(73) Assignee: JATCO Ltd, Fuji-shi (JP)

( * ) Notice: Subject to any disclaimer, the term of this patent is extended or adjusted under 35 U.S.C. 154(b) by 351 days.

(21) Appl. No.: 12/690,507

(22) Filed: Jan. 20, 2010

(65) Prior Publication Data

US 2010/0204009 A1    Aug. 12, 2010

(30) Foreign Application Priority Data

Feb. 12, 2009 (JP) ................................. 2009-029316

(51) Int. Cl.
*F16H 31/00*    (2006.01)
(52) U.S. Cl. ....................................................... 475/119
(58) Field of Classification Search .................... 475/119
See application file for complete search history.

(56) References Cited

U.S. PATENT DOCUMENTS

| | | | |
|---|---|---|---|
| 5,460,577 A * | 10/1995 | Moroto et al. ................ | 475/123 |
| 5,613,921 A * | 3/1997 | Sugiyama et al. ............ | 477/125 |
| 5,682,791 A * | 11/1997 | Liesener ........................ | 74/335 |
| 6,102,826 A * | 8/2000 | Takahashi et al. ............ | 475/119 |
| 6,217,479 B1 | 4/2001 | Brown et al. | |
| 6,537,180 B2 * | 3/2003 | Kim et al. ..................... | 477/130 |
| 7,320,657 B2 * | 1/2008 | Nozaki et al. ................. | 475/119 |

FOREIGN PATENT DOCUMENTS

JP    2006-275199 A    10/2006

* cited by examiner

*Primary Examiner* — Dirk Wright
(74) *Attorney, Agent, or Firm* — Foley & Lardner LLP

(57) ABSTRACT

A dual purpose pressure adjusting valve provides a hydraulic pressure upon failure of electric power supply and controls the hydraulic pressure selectively directed toward a high clutch and a low & reverse brake using a line pressure, that bypasses a manual valve, as a source pressure. A switching valve switches hydraulic pressure feeding passages of the high clutch and low & reverse brake in response to selection of a range position between D-range position and R-range position. A first rotation member and a transmission input shaft are connected to each other when the high clutch is engaged. The first rotation member is a member other than a transmission output gear. A high clutch inhibitor valve uses D-range pressure PD as a signal pressure and is arranged between the switching valve and the high clutch. The high clutch inhibitor valve opens a communication between the dual purpose pressure adjusting valve and the high clutch when the signal pressure is applied thereto and doses the communication between the dual purpose pressure adjusting valve and the high clutch when the signal pressure is not applied thereto.

7 Claims, 9 Drawing Sheets

| SPEED | FRICTIONAL ELEMENTS | | | | |
|---|---|---|---|---|---|
| | L/C | H/C | REV/C | L&R/B | 2-4/B |
| 1st SPEED | ○ | | | ○ | |
| 2nd SPEED | ○ | | | | ○ |
| 3rd SPEED | ○ | ○ | | | |
| 4th SPEED | | ○ | | | ○ |
| REVERSE | | | ○ | ○ | |

D-RANGE 3rd SPEED
(ELECTRIC POWER ENTIRELY SHUT DOWN (FAILURE))

R-RANGE
(ELECTRIC POWER ENTIRELY SHUT DOWN (FAILURE))

HYDRAULIC CONTROL DEVICE OF AUTOMATIC TRANSMISSION

BACKGROUND OF THE INVENTION

1. Field of the Invention

The present invention relates in general to automotive automatic transmissions of a stepwise type that includes planetary gear units and a plurality of frictional elements for obtaining a plurality of stepwisely varied speeds, and more particularly to hydraulic control devices for hydraulically controlling the transmissions.

2. Description of the Related Art

One of the known hydraulic control devices of the above-mentioned type is shown in Japanese Laid-open Patent Application (Tokkai) 2006-275199. In the hydraulic control device of the publication, the hydraulic pressure from a solenoid valve is selectively fed to two frictional elements, which are engaged in different speed ranges, in accordance with a vehicle operating condition. With such arrangement, the number of parts used for assembling the transmission can be reduced. For ease of description, the arrangement by which the number of parts can be reduced will be referred to as "part reduction arrangement" in the following.

In general, in the automotive automatic transmissions, for permitting the motor vehicle to move (for traction) even when the electric power is entirely shut down due to failure of operation of the transmission, a pressure adjusting valve that adjusts the pressure for establishing a given speed upon failure of the transmission is constructed to receive a given hydraulic pressure even when the electric power is entirely shut down.

For ease of description, the system having such a fail-safe function will be referred to as "power shut off fail-safe system" in the following.

SUMMARY OF THE INVENTION

However, if this power shut off fail-safe system is simply applied to the above-mentioned part reduction arrangement, the following construction has to be inherently used. That is, a solenoid valve has to control two hydraulic pressures for the two frictional elements which are engaged in different speed ranges and the solenoid valve has to produce a certain hydraulic pressure even in the shut down condition of the electric power. Usually, in this case, a hydraulic pressure that has bypassed a to manual valve is used as a source pressure of the solenoid valve, so that a hydraulic circuit of the transmission and operation control of the same are simplified. In this case, it is necessary to provide a switching valve at a downstream portion of the circuit to switch frictional elements to which the hydraulic pressure from the solenoid valve is fed.

However, due to its inherent arrangement, the above-mentioned hydraulic circuit tends to have the following drawbacks.

That is, when, with the engine being under idling, the transmission taking N-range and the brake kept depressed (viz., vehicle speed is zero), an ignition key cylinder is turned to OFF position, a higher hydraulic pressure is applied, but for a short time, to a frictional element (for example, high clutch that is engaged at third speed) that is engaged at a speed selected at the failure, since the solenoid valve is constructed to produce such higher hydraulic pressure when the electric power is shut down (viz., the ignition key cylinder is turned to the OFF position). This phenomenon is remarkable when, due to higher idling speed, it takes a long time to reduce the engine speed to a sufficiently low level.

Under this condition wherein N-range is kept selected, rotational output members in the transmission do not rotate due to the stop condition of the vehicle. However, even under this N-range selection, other rotational members in the transmission are forced to rotate but at a slow speed due to a friction that the corresponding frictional elements inevitably have. Such rotational other members are subjected to a speed increase due to a rapid engagement of the corresponding frictional element when the above-mentioned higher hydraulic pressure is supplied to the element, and upon this, the rotation speed of the other rotation members is increased to a level of an input rotation speed of the transmission, which tends to wreck balanced operation or rotation of the transmission and thus produce a to noise.

Accordingly, it is an object of the present invention to provide a hydraulic control device of an automatic transmission, which is free of the above-mentioned drawbacks.

More specifically, it is an object of the present invention to provide a hydraulic control device of an automatic transmission, which enjoys both the "part reduction arrangement" and "power shut off fail-safe system" and prevents generation of noise due to rapid engagement of the frictional element even when, with the engine being under idling and the transmission taking N-range, the ignition key cylinder is turned to OFF position.

In accordance with a first aspect of the present invention, there is provided a hydraulic control device of an automatic transmission. The transmission includes first and second frictional elements that are respectively engaged at different range positions and first and second rotation members that are connected to each other when the first frictional element is engaged, the first and second rotation members being members other than a transmission output member. The hydraulic control device comprises a solenoid valve that provides a hydraulic pressure upon failure of an electric power supply of the transmission and controls the hydraulic pressure selectively directed toward the first and second frictional elements by using a line pressure, that bypasses a manual valve, as a source pressure; a first switching valve that leads the hydraulic pressure from the solenoid valve to the first frictional element when a forward range position is selected and leads the hydraulic pressure from the solenoid valve to the second frictional element when a reverse range position is selected; a second switching valve that is arranged between the first switching valve and the first frictional element, the second switching valve using a hydraulic pressure, which is provided when the forward range position is selected, as a signal pressure, wherein the second switching valve opens a fluid communication between the solenoid valve and the first frictional element through the first switching valve when applied with the signal pressure and closes the fluid communication with applied with no signal pressure.

In accordance with a second aspect of the present invention, there is provided a hydraulic control device of an automatic transmission. The transmission includes first and second frictional elements that are respectively engaged at different range positions and first and second rotation members that are connected to each other when the first frictional element is engaged, the first and second rotation members being members other than a transmission output member. The hydraulic control device comprises a manual valve through which line pressure is directed toward various frictional elements selectively when the transmission is in a proper working condition; a solenoid valve that provides a hydraulic pressure upon failure of an electric power supply of the transmission and controls the hydraulic pressure that is selectively directed toward the first and second frictional elements, the hydraulic pressure being the line pressure that bypasses the manual valve; a first switching valve that, upon selection of a forward range position, feeds the hydraulic pressure from the solenoid valve to the first frictional element and upon selection of a reverse range position, feeds the hydraulic pressure from the solenoid valve to the second frictional element; and a second switching valve arranged between the first switching valve and the first frictional element, the second switching valve using a hydraulic pressure, which is provided when the forward range position is selected, as a signal pressure, wherein the second switching valve opens a given fluid communication between the solenoid valve and the first frictional element through the first switching valve when applied with the signal pressure, and closes the given fluid communication when applied with no signal pressure.

In accordance with a third aspect of the present invention, there is provided a hydraulic control device of an automatic transmission. The transmission includes a clutch and a brake that are respectively engaged at different range positions and a first rotation member other than a transmission output member and a transmission input shaft that are connected to each other when the clutch is engaged. The hydraulic control device comprises a dual purpose pressure adjusting valve that provides a hydraulic pressure upon failure of electric power supply of the transmission and controls the hydraulic pressure selectively directed toward the clutch and brake by using a line pressure, that bypasses a manual valve, as a source pressure; a switching valve that leads the hydraulic pressure from the dual purpose pressure adjusting valve to the clutch when D-range position is selected and leads the hydraulic pressure from the dual purpose pressure adjusting valve to the brake when R-range position is selected; and a clutch inhibitor valve that is arranged between the switching valve and the clutch, the clutch inhibitor valve using a hydraulic pressure, which is provided when the D-range position is selected, as a signal pressure, wherein the clutch inhibitor valve opens a given fluid communication between the dual purpose pressure adjusting valve and the clutch through the switching valve when applied with the signal pressure and closes the given fluid communication when applied with no signal pressure.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a hydraulic control device of an automatic transmission according to the present invention will be described in detail with reference to the accompanying drawings.

Figure 1:
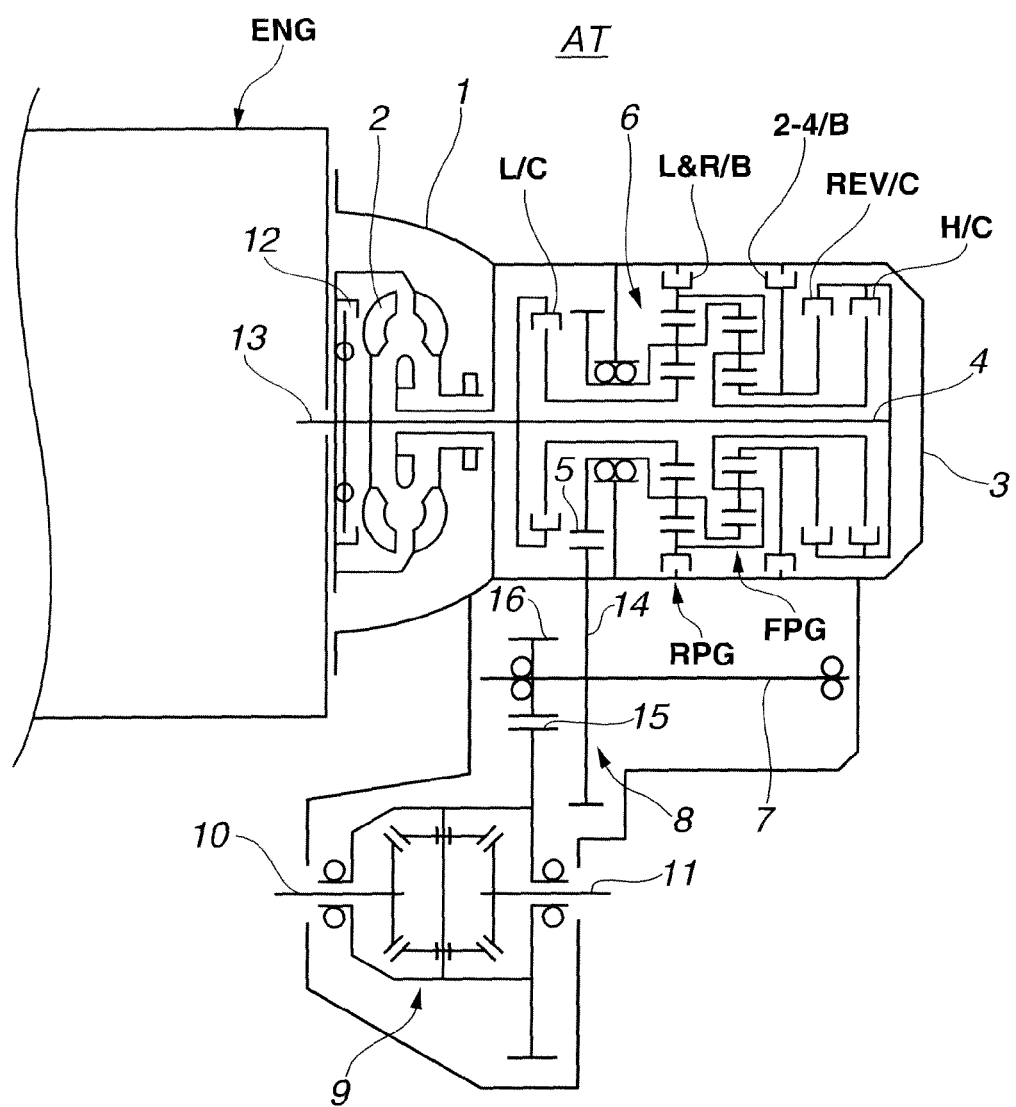
FIG. 1 is a skeleton view of an automatic transmission for use in a front engine and front drive type motor vehicle to which a hydraulic control device of the present invention is practically applied, the transmission being of a four forward speeds and one reverse type.

Referring to FIG. 1, there is shown an automotive automatic transmission AT to which a hydraulic control device of the present invention is practically applied. The automatic transmission AT shown is of a four forward speeds and one reverse type typically mounted to a front engine and front drive type (viz., FF type) motor vehicle.

As is seen from FIG. 1, the automatic transmission AT shown comprises generally a converter housing 1, a torque converter 2, a transaxle case 3, a transmission input shaft 4, a transmission output gear 5, a power train 6, a reduction gear shaft 7, a reduction gear 8, a differential gear mechanism 9, a left drive shaft 10 and a right drive shaft 11.

The converter housing 1 houses therein the torque converter 2 and a lock-up clutch 12 operatively connected to the torque converter 2. Upon engagement, the lock-up clutch 12 directly connects a crankshaft (or output shaft) 13 of an engine Eng to the transmission input shaft 4.

As shown, the transaxle case 3 is coupled with the converter housing 1 and houses therein the power train 6, the reduction gear mechanism 8 and the differential gear mechanism 9. The power train 6 has a speed change function, a reverse drive function and a neutral function, the reduction gear mechanism 8 has a speed reduction function and the differential gear mechanism 9 has a differential function.

The power train 6 is arranged between the transmission input shaft 4 and the transmission output gear 5 and generally comprises a front planetary gear unit FPG, a rear planetary gear unit RPG, a low clutch L/C, a low & reverse brake L&R/B, a 2-4 brake 2-4/B, a reverse clutch REV/C and a high clutch H/C.

The reduction gear mechanism 8 comprises the reduction gear shaft 7, a first reduction gear 14 that is disposed on the reduction gear shaft 7 and meshed with the transmission output gear 5 and a second reduction gear 16 that is disposed on the reduction gar shaft 7 and meshed with a drive input gear 15 of the differential gear mechanism 9.

The differential gear mechanism 9 receives a driving force from the drive input gear 15 and equally delivers the driving force to the left and right drive shafts 10 and 11 while permitting a differential therebetween. Although not shown in the drawing, the left and right drive shafts 10 and 11 have at leading ends thereof left and right drive road wheels.

Figures 2, 3:
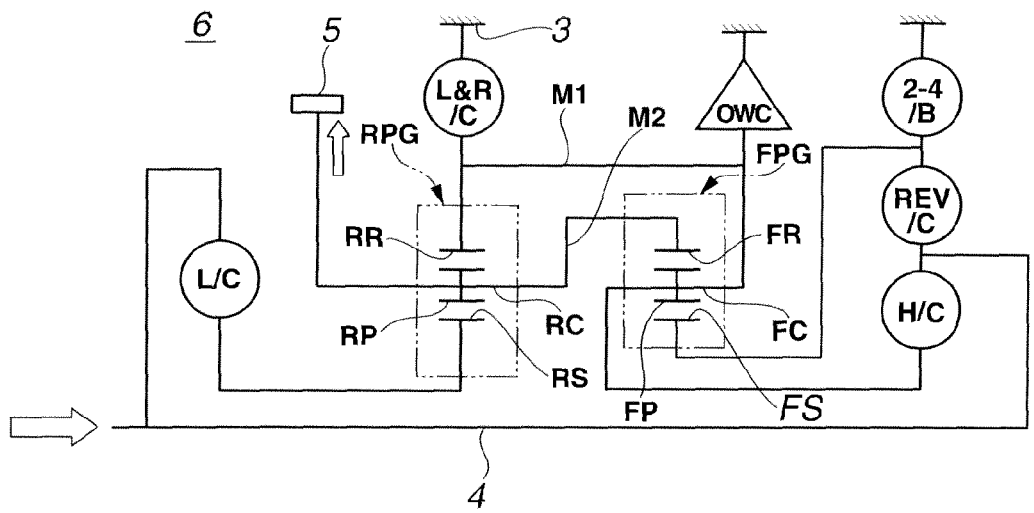
FIG. 2 is a skeleton view of the automatic transmission showing a power train, to which the hydraulic control device of the present invention is practically applied.
FIG. 3 is a table showing ON (or engaged)/OFF (or disengaged) condition of frictional elements of the automatic transmission in each speed, ON condition being indicated by a circle.

Referring to FIG. 2, there is schematically shown the power train 6 practically built in the automatic transmission AT.

As shown, the power train 6 comprises two planetary gear units which are the front and rear planetary gear units FPG and RPG which are of a single pinion type, and a plurality of frictional elements which are the low clutch L/C, the low & reverse brake L&R/B, the 2-4 brake 2-4/B, the reverse clutch REV/C and the high clutch H/C. As shown, a one-way clutch OWC is arranged in parallel with the low & reverse brake L&R/B.

The front planetary gear unit FPG comprises a front sun gear FS, a front ring gear FR, front pinions FP each being meshed with both the front sun gear FS and front ring gear FR and a front pinion carrier FC that carries the front pinions FP.

The rear planetary gear unit RPG comprises a rear sun gear RS, a rear ring gear RR, rear pinions RP each being meshed with both the rear sun gear RS and rear ring gear RR and a rear pinion carrier RC.

The front pinion carrier FC and the rear ring gear RR are integrally connected by a first rotation member M1. The front ring gear FR and the rear pinion carrier RC are integrally connected by a second rotation member M2. Accordingly, by combining the front and rear planetary gear units FPG and RPG in the above-mentioned manner, there is constructed a system that has four rotation members which are the front sun gear FS, rear sun gear RS, first rotation member M1 and second rotation member M2. The system is provided by subtracting the number (viz., two) of the mutually fixed rotation members from the number (viz., six) of the rotation members that are essentially possessed by the two planetary gear units FPG and RPG.

The front sun gear FS is connected to the transmission input shaft 4 through the reverse clutch REV/C. Thus, in accordance with ON (viz., engaged)/OFF (viz., disengaged) condition of the reverse clutch REV/C, the connection between the front sun gear FS and the transmission input shaft 4 is established or not established. Furthermore, the front sun gear FS is connected to the transaxle case 3 through the 2-4 brake 2-4/B. Thus, when the 2-4 brake takes ON (viz., braking condition), the front sun gear FS is fixed to the transaxle case 3.

The rear sun gear RS is connected to the transmission input shaft 4 through the low clutch L/C. Thus, in accordance with ON (viz., engaged)/OFF (viz., disengaged) condition of the low clutch L/C, the connection between the rear sun gear RS and the transmission input shaft 4 is established or not established.

The first rotation member M1 is connected to the transaxle case 3 through the low & reverse brake L&R/B (and the one way clutch OWC). Thus, when the low & reverse brake L&R/B takes ON (viz., braking condition), the first rotation member M1 is fixed to the transaxle case 3. The first rotation member M1 is connected to the transmission input shaft 4 through the high clutch H/C. Thus, in accordance with ON (viz., engaged)/OFF (viz., disengaged) condition of the high clutch H/C, the connection between the first rotation member M1 and the transmission input shaft 4 is established or not established.

The second rotation member M2 is directly connected to the transmission output gear 5.

Referring to FIG. 3, there is shown a table that shows ON (or engaged)/OFF (or disengaged) condition of the frictional elements of the automatic transmission AT in each speed. ON condition is indicated by a circle.

By carrying out a so-called "Shift Replacement" wherein one frictional element that has been engaged becomes disengaged and another frictional element that has been disengaged becomes engaged, the following four forward speeds and one reverse are obtained.

That is, as is seen from the table of FIG. 3, when both the low clutch L/C and the low & reverse brake L&R/B take the engaged (or ON) condition, first speed is established allowing an engine brake, while when only the low clutch L/C takes the engaged (or ON) condition, first speed is established not allowing the engine brake. When both the low clutch L/C and the 2-4 brake 2-4/B take the engaged (or ON) condition, second speed is established. When both the low clutch L/C and the high clutch H/C take the engaged (or ON) condition, third speed is established. When both the high clutch H/C and the 2-4 brake 2-4/B take the engaged (or ON) condition, fourth speed is established. Furthermore, when both the reverse clutch REV/C and the low & reverse brake L&R/B take the engaged (or ON) condition, reverse mode is established in the transmission.

Figure 4:
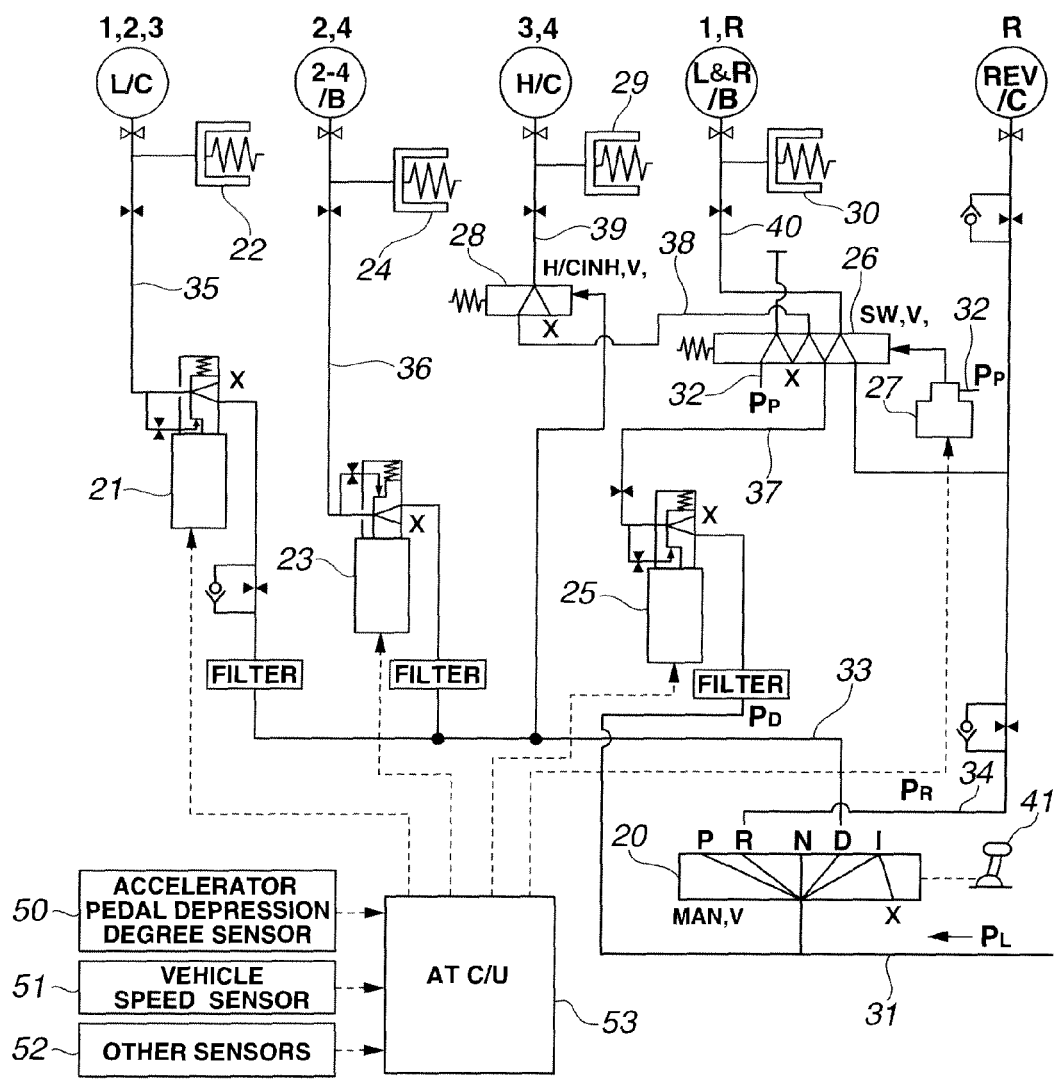
FIG. 4 is a block diagram of a hydraulic control system including a hydraulic pressure control circuit and an electronic shifting control system, which is the hydraulic control device of the present invention.

Referring to FIG. 4, there is shown a hydraulic control system that shows essential elements of the hydraulic control device of the invention that are incorporated with the above-mentioned frictional elements L/C, 2-4/B, H/C, L&R/B and REV/B of the automatic transmission AT in the illustrated manner.

As is understood from FIG. 4, the hydraulic control device comprises a manual valve 20, a low clutch pressure adjusting to valve 21, a low clutch pressure accumulator 22, a 2-4 brake pressure adjusting valve 23, a 2-4 brake pressure accumulator 24, a dual purpose pressure adjusting valve 25 (or solenoid valve), a switching valve 26 (or first switching valve), a switching solenoid 27, a high clutch inhibitor valve 28 (or second switching is valve), a high clutch pressure accumulator 29 and a low & reverse brake pressure accumulator 30. These elements are fluidly connected to one another in the illustrated manner through a line pressure passage 31, a pilot pressure passage 32, a D-range pressure passage 33, a R-range pressure passage 34, a low clutch pressure passage 35, a 2-4 brake pressure passage 36, a dual purpose pressure output passage 37, a first high clutch pressure passage 38, a second high clutch pressure passage 39 and a low & reverse brake pressure passage 40.

The manual valve 20 is actuated by a select lever 41 manipulated or handled by a driver. The select lever 41 is constructed to have D-range wherein first to fourth speeds are selectively established (first speed has not engine brake allowed), II-range wherein first and second speeds are selectively established (first speed has engine brake allowed), R-range wherein reverse mode is established, Neutral-range wherein all of the clutches are disengaged, and Parking-range wherein a parking gear is locked.

If the select lever 41 selects the D-range due to the driver's will, the manual valve 20 is shifted to a position to lead the line pressure PL from the line pressure passage 31 to the D-range pressure passage 33, and if the select lever 41 selects the R-range, the manual valve 20 is shifted to a position to lead the line pressure PL from the line pressure passage 31 to the R-range pressure passage 34.

The low clutch pressure adjusting valve 21 is of a three-way mass volume linear solenoid valve of Normal High type. For engaging the low clutch L/C for establishing a given speed (viz., first, second or third speed), the low clutch pressure adjusting valve 21 functions to lead the low clutch pressure, which has been adjusted by using the D-range pressure PD from the D-range pressure passage 33 as a source pressure, to the low clutch L/C through the low clutch pressure passage 35. While, for disengaging the low clutch L/C for establishing a given speed (viz., fourth speed or Reverse mode), the pressure adjusting valve 21 functions to drain the low clutch pressure fed to the low clutch L/C.

The 2-4 brake pressure adjusting valve 23 is of a three-way mass volume linear solenoid valve of Normal Low type. For engaging the 2-4 brake 2-4/B for establishing a given speed (viz., second or fourth speed), the 2-4 brake pressure adjusting valve 23 functions to lead 2-4 brake pressure, which has been adjusted by using the D-range pressure PD from the D-range pressure passage 33 as a source pressure, to the 2-4 brake 2-4/B through the 2-4 brake pressure passage 36. While, for disengaging the 2-4 brake 2-4/B for establishing a given speed (viz., first speed, third speed or reverse mode), the pressure adjusting valve 23 functions to drain a 2-4 brake pressure fed to the 2-4 brake 2-4/B.

The dual purpose pressure adjusting valve 25 is of a three-way mass volume linear solenoid valve of Normal High type. The dual purpose pressure adjusting valve 25 functions to lead the pressure, which has been adjusted by using the pressure (viz., line pressure PL) that has bypassed the manual valve 20 as a source pressure, to either one of the high clutch HC (viz., first frictional element) and the low & reverse brake L&R/B (or second frictional element) through the switching valve 26. That is, since the high clutch H/C (for establishing third or fourth speed) and the low & reverse brake L&R/B (for establishing first speed or reverse mode) take respective engaged conditions in different range positions and different speeds, the dual purpose pressure adjusting valve 25 controls both the pressure led to the high clutch H/C and the pressure led to the low & reverse brake L&R/B. In these frictional elements, the high clutch H/C is a clutch that is able to couple the first rotation member M1 (first rotation member), which is a rotation member other than the transmission output gear 5, to the transmission input shaft 4 (second rotation member). Thus, when, with the transmission output gear 5 kept fixed due to depression of a brake pedal (not shown), the high clutch H/C takes the engaged condition during idling due to selection of Neutral-range, the first rotation member M1 is forced to rotate due to the toque possessed by the transmission input shaft 4.

The above-mentioned switching solenoid 27 is of a Normal Low type ON/OFF solenoid that produces no hydraulic pressure when the electric power is shut down.

When the switching solenoid 27 is in OFF condition (no hydraulic pressure is produced) and the D-range is selected, the switching valve 26 functions to lead the hydraulic pressure from the dual purpose pressure adjusting valve 25 to the high clutch H/C, and when the switching solenoid 27 is in ON condition (hydraulic pressure is produced) and the R-range is selected, the switching valve 26 functions to lead the hydraulic pressure from the dual purpose pressure adjusting valve 25 to the low & reverse brake L&R/B. That is, switching between the pressure feeding to the high clutch H/C and that to the low & reverse brake L&R/B are carried out by the switching valve 26 in the above-mentioned manner.

Furthermore, when the switching solenoid 27 is in OFF condition causing the switching valve 26 to take a position to lead the hydraulic pressure from the dual purpose pressure adjusting valve 25 to the high clutch inhibitor valve 28, the switching valve 26 functions to lead a R-range pressure, which is produced when the manual valve 20 takes the R-range, to the low & reverse brake L&R/B.

The high clutch inhibitor valve 28 (or second switching valve) is arranged between the switching valve 26 (or first switching valve) and the high clutch H/C (or first frictional element) and carries out a switching action using the D-range pressure PD, which is produced upon selection of the D-range, as a pilot pressure. That is, when the D-range pressure PD is in operation, the connection between the dual purpose pressure adjusting valve 25 and the high clutch H/C is opened, while, when the D-range pressure PD is not in operation, the connection is closed.

As is seen from FIG. 4, an electronic control section of the hydraulic control system comprises an accelerator pedal depression degree sensor (or accelerator operation degree sensor) 50 that senses an accelerator pedal depression degree APO, a vehicle speed sensor 51 that senses a vehicle speed VSP, other known sensors 52 such as transmission input shaft rotation speed sensor, inhibitor switches, etc., and a control unit 53.

As is seen from FIG. 4, upon receiving information signals from the accelerator pedal depression degree sensor 50, the vehicle speed sensor 51 and other sensors 52, the control unit 53 processes these signals with reference to given shift maps to produce suitable instruction signals that are fed to the low clutch pressure adjusting valve 21, 2-4 brake pressure adjusting valve 23, dual purpose pressure adjusting valve 25 and switching solenoid 27.

That is, for example, during cruising of the vehicle under D-range selected, the most suitable speed is searched from a certain shift map that shows a shift point with reference to the accelerator pedal depression degree APO and the vehicle speed VSP and the control unit 53 issues suitable instruction signals to the three pressure adjusting valves 21, 23 and 25 and the switching solenoid 27 for causing the transmission AT to take the most suitable speed searched. As is known, the shift map is a map on which up-shift and down-shift lines are plotted or drawn with respect the accelerator pedal depression degree and the vehicle speed.

In the following, operation will be described in detail with reference to the drawings.

At first, for clarifying the feature of the present invention, the reason for generation of shock or noise at the time when, under N-range of the transmission and higher idling speed of the engine, the ignition key cylinder is turned to OFF position, which would occur in the automatic transmission controlled by a known hydraulic control device, will be briefly described in the following.

[The Reason for Generation of Shock or Noise at the Above-Mentioned Condition]

Figure 5:
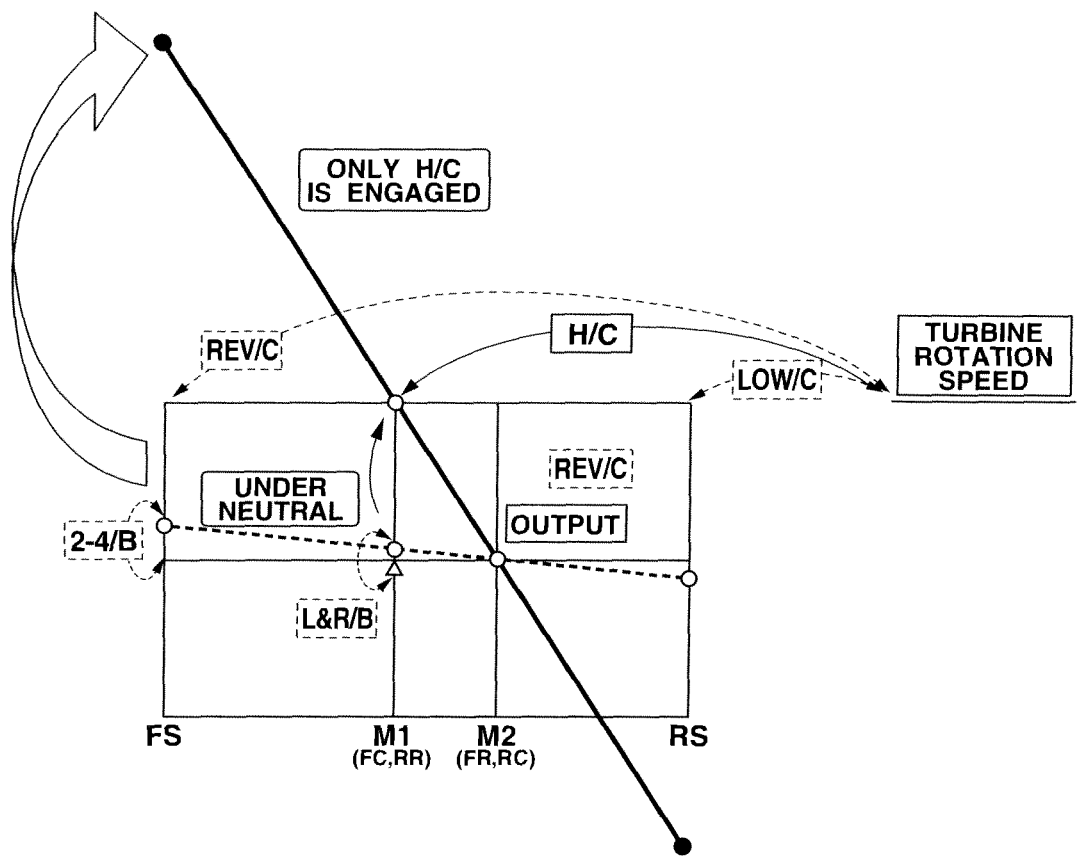
FIG. 5 is a speed diagram depicting a reason of production of noise at the time when, with the transmission selecting N-range and the engine being under high idling, an ignition key cylinder is turned to OFF position.

FIG. 5 is a speed diagram showing a rotation speed change of the engine which causes generation of noise when, under N-range and higher idling speed, the ignition key cylinder is turned to OFF position.

When, with the transmission keeping N-range and the brake pedal kept depressed permitting idling condition of the engine (vehicle speed is zero), the ignition key cylinder is turned to OFF position, the characteristic of the dual purpose pressure adjusting valve 25 (viz., Normal High which produces a certain hydraulic pressure when the electric power is shut down) causes the line pressure PL (which is relatively high in pressure) to be fed, for a given short time, to the high clutch H/C that is to be engaged at the third speed upon failure of the transmission.

Since, under this condition, the transmission is taking the N-range, the second rotation member M2, which is an output rotation member of the power train, shows zero ration speed (viz., the vehicle is at a standstill). However, even in the N-range, the first rotation member M1, the rear sun gear RS and the front sun gear FS, which are those other than the output rotation member, are forced to rotate but slowly due to the friction that the frictional elements inevitably have. That is, under selection of the N-range, the above-mentioned four rotational members of the power train are to have zero speed. However, practically, due to friction of the frictional elements, the first rotation member M1, the rear sun gear RS and the front sun gear FS are caused to rotate slightly as is indicated by the dotted characteristic line of FIG. 5.

If, under such condition, the high clutch H/C is suddenly engaged as is mentioned hereinabove, the rotation speed of the first rotation member M1, which has kept the slow rotation, is forced to increase to the input rotation speed (=turbine speed) whose rotation speed is lowering due to the turn OFF operation of the ignition key cylinder, which however induces imbalanced rotation in the transmission and finally increases the rotation speed of the front sun gear FS (=rotation speed of the reverse drum) in accordance with the gear ratio of the planetary gear unit of the input rotation speed. Accordingly, a marked shock is produced due to the inertia change making the passengers uncomfortable. In particular, when the engine idling speed is relatively high for example about 1,700 rmp in a low temperature condition and thus a certain time is needed for lowering the engine speed, such shock becomes remarkable.

Under selection of the N-range, transmission of torque to the transmission output gear 5 does not take place due to the work or function of the manual valve 20 and the switching valve 26. Thus, the remaining problem that should be solved is to eliminate the shock.

[Noise Suppressing Operation Under N-Range]

Figure 6:
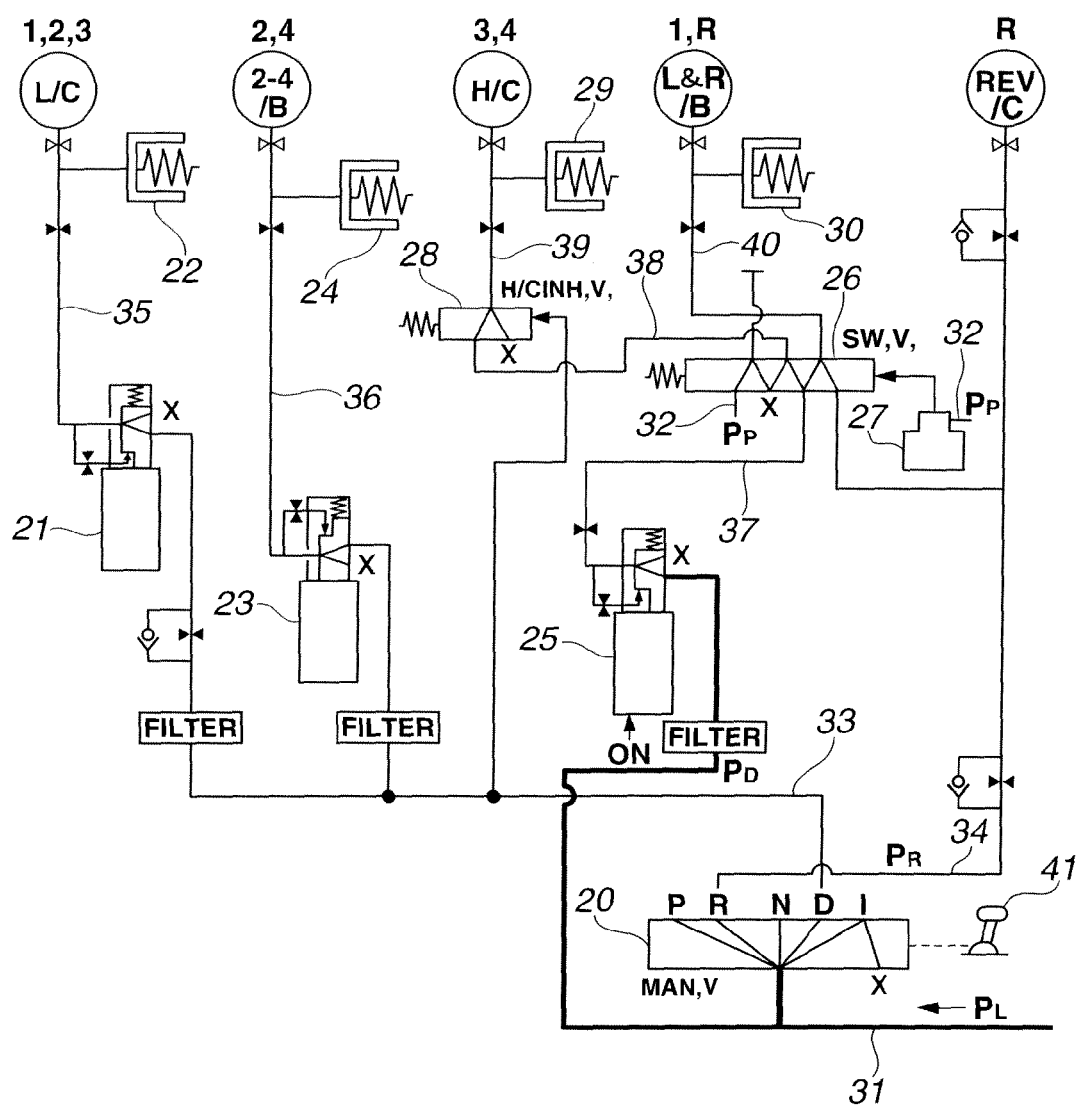
FIG. 6 is a view similar to FIG. 4, but showing a condition wherein the transmission selects N-range and the ignition key cylinder takes ON position.
Figure 7:
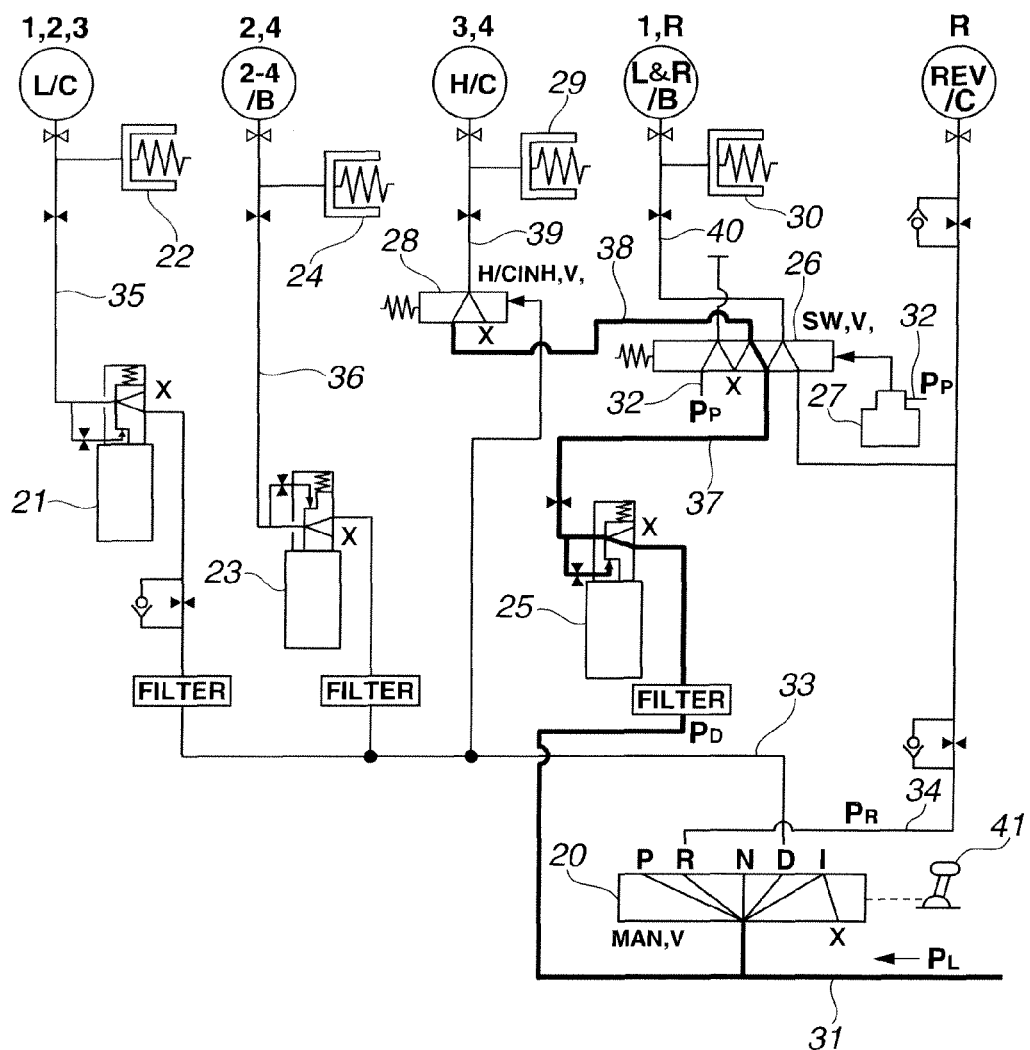
FIG. 7 is a view similar to FIG. 4, but showing a condition wherein the transmission selects N-range and the ignition key cylinder takes OFF position.

FIG. 6 is a view similar to FIG. 4, but showing a condition wherein the transmission selects N-range and the ignition key cylinder takes ON position. While, FIG. 7 is a view similar to FIG. 4, to but showing a condition wherein the transmission selects N-range and the ignition key cylinder takes OFF position.

As is seen from the drawing of FIG. 6, when the transmission selects N-range and the ignition key cylinder takes ON position, the manual valve 20 takes N-range issuing ON signal is to the dual purpose pressure adjusting valve 25 of Normal High type. Thus, as is indicated by a thicker line in FIG. 6, the line pressure passage 31 is fed with the line pressure PL.

When, under this condition, the ignition key cylinder is turned to OFF position, OFF signal is fed to the dual purpose pressure adjusting valve 25 of Normal High type having the manual valve 20 left at N-range. Thus, as is indicated by a thicker line in FIG. 7, the line pressure PL in the line pressure passage 31 is led to a port of the high clutch inhibitor valve 28 through the dual purpose pressure adjusting valve 25, the dual purpose pressure output passage 37, the switching valve 26 and the first high clutch pressure passage 38. That is, the high clutch inhibitor valve 28, which uses the D-range pressure PD as a signal pressure, functions to close the hydraulic passage to the high clutch H/C under selection of N-range wherein the D-range pressure PD is not applied to the valve 28.

Accordingly, when, with the N-range kept selected, the ignition key cylinder is turned to OFF position, the line pressure PL from the dual purpose pressure adjusting valve 25 is blocked by the high clutch inhibitor valve 28, and thus, the high clutch H/C is prevented from being engaged by a higher hydraulic pressure and thus, generation of noise, which would be caused by the above-mentioned rapid engagement of the high clutch H/C, is suppressed.

[Hydraulic Pressure Control Operation Under D-Range]

Figure 8:
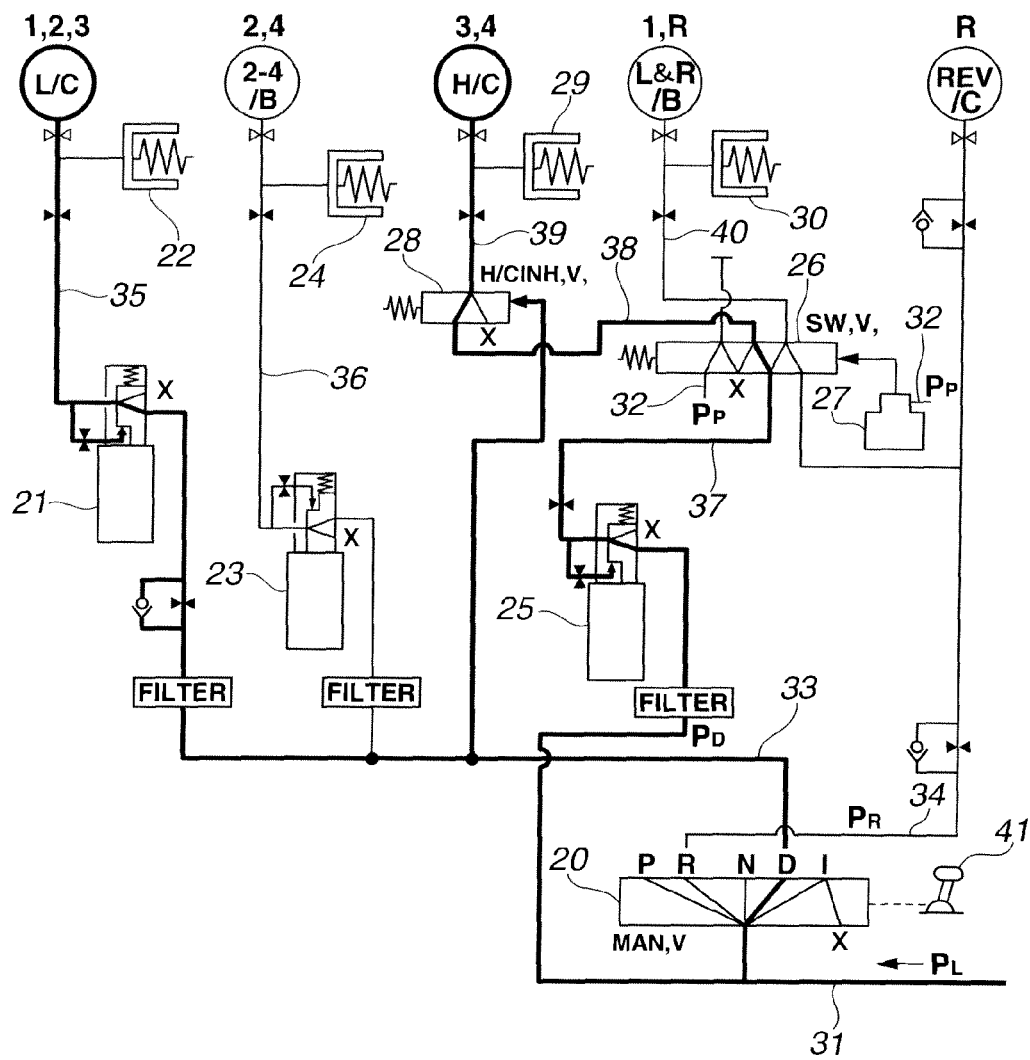
FIG. 8 is a view similar to FIG. 4, but showing a condition wherein the transmission selects D-range and the electric power is entirely shut down due to failure of the transmission.

FIG. 8 is a view similar to FIG. 4, but showing a condition wherein the transmission selects D-range and the electric power is entirely shut down due to failure of the power source.

As is seen from the drawing of FIG. 8, when, with D-range kept selected, the power failure takes place, OFF signal is issued to the dual purpose pressure adjusting valve 25 of Normal High type having the manual valve 20 left at D-range. Thus, as is indicated by a thicker line in FIG. 8, the line pressure PL in the line pressure passage 31 is led to the high clutch H/C through the dual purse pressure adjusting valve 25, the dual purpose pressure output passage 37, the switching valve 26, the first high clutch pressure passage 38, the high clutch inhibitor valve 28 and the second high clutch pressure passage 39. That is, the high clutch inhibitor valve 28, which uses the D-range pressure PD as a signal pressure, functions to open the passage to the high clutch H/C under section of D-range wherein the D-range pressure PD is applied to the valve 28.

While, the D-range pressure PD that has passed through the D-range pressure port of the manual valve 20 is led to the low clutch L/C through the D-range pressure passage 33, the low clutch pressure adjusting valve 21 and the low clutch pressure passage 35.

Accordingly, when, under cruising with D-range kept, the electric power is entirely shut down due to failure, or when D-range is selected at the time when the electric power failure is taking place, the high clutch inhibitor valve 28 is switched to an open side and thus the high clutch H/C is assuredly engaged. At the same time, since the D-range pressure PD passes through the low clutch pressure adjusting valve 21 of Normal High, the low clutch L/C can be engaged. That is, both the high clutch H/C and low clutch L/C take the engaged condition, and thus, as is seen from the table of FIG. 3, the third speed is established.

[Hydraulic Pressure Control Operation Under R-Range]

Figure 9:
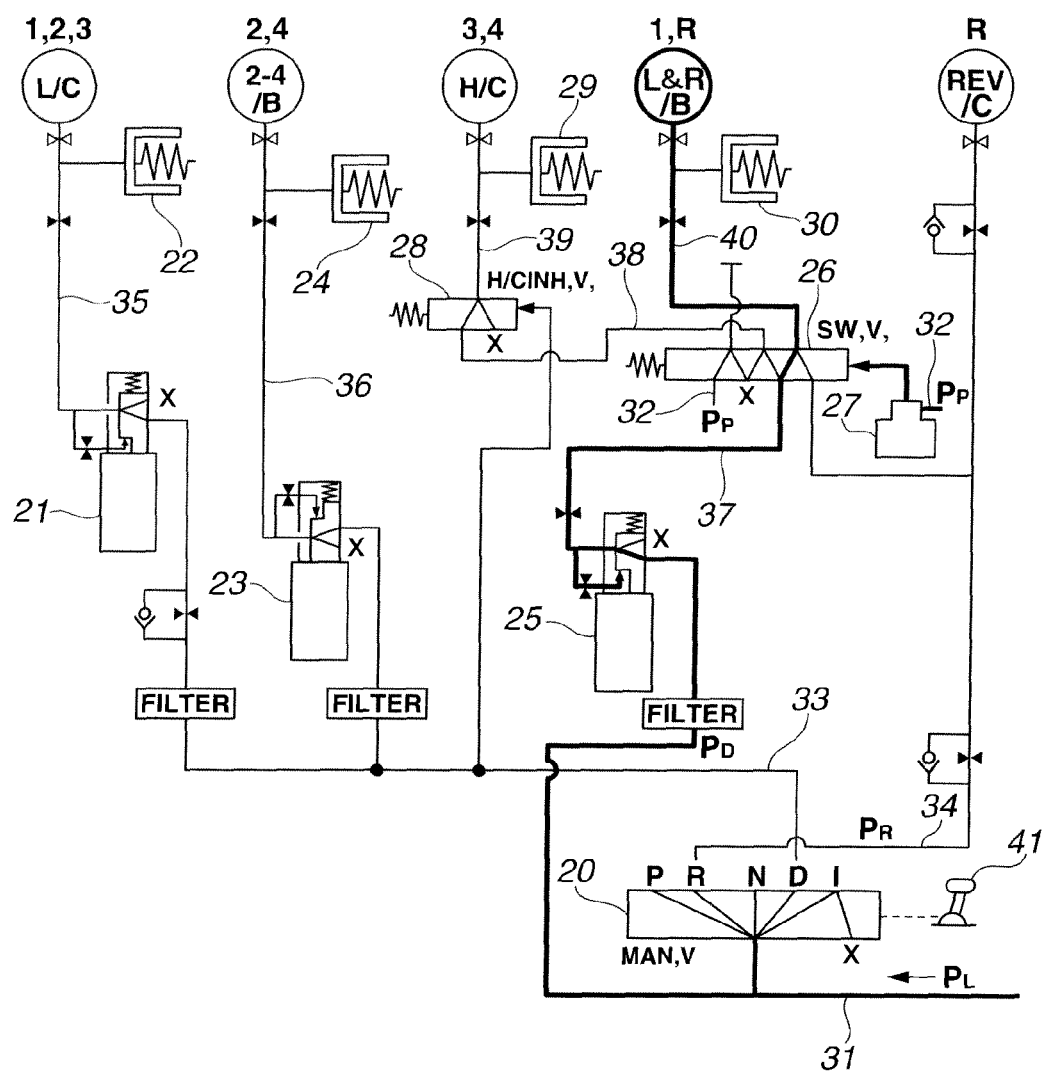
FIG. 9 is a view similar to FIG. 4, but showing a condition wherein a shifting from N-range to R-range is being carried out by the automatic transmission.
Figure 10:
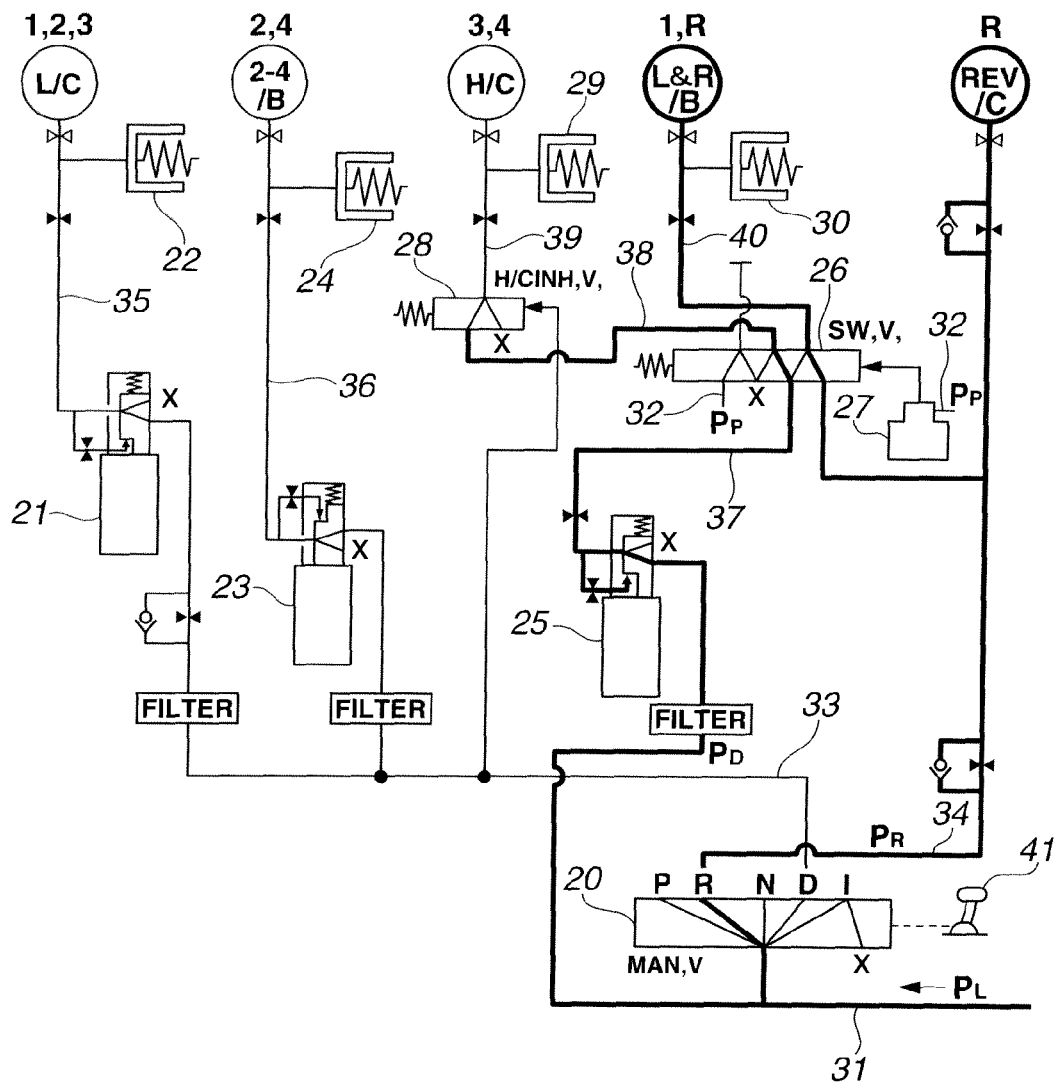
FIG. 10 is a view similar to FIG. 4, but showing a condition wherein the transmission selects R-range and the electric power is entirely shut down.

FIG. 9 is a view similar to FIG. 4, but showing a condition wherein a shifting from N-range to R-range is being carried out by the automatic transmission AT. FIG. 10 is a view similar to FIG. 4, but showing a condition wherein with R-range kept selected, the electric power is entirely shut down.

When, during shifting from N-range to R-range, ON signal is issued to the switching solenoid 27 with the transmission taking N-range side, the line pressure PL in the line pressure passage 31 is led to the low & reverse brake L&R/B through the dual purpose pressure adjusting valve 25, the dual purpose pressure output passage 37, the switching valve 26 and the low & reverse brake pressure passage 40 as is indicated by a thicker line in FIG. 9.

While, during shifting from N-range to R-range, ON signal is issued to the switching valve 27 with the transmission taking R-range side, the R-range pressure PR that has passed through the R-range pressure port of the manual valve 20 is led to the reverse clutch REV/C through the R-range pressure passage 34 and at the same time to the low & reverse brake L&R/B through the switching valve 26 and the low & reverse brake pressure passage 40, as is indicated by a thicker line in FIG. 10. Under this condition, the line pressure PL from the line pressure passage 31 is led to the port of the high clutch inhibitor valve 28 through the dual purpose pressure adjusting valve 25, the dual purpose output pressure passage 37, the switching valve 26 and the first high clutch pressure passage 38. That is, the high clutch inhibitor valve 28, which uses the D-range pressure PD as a pilot pressure, functions to close the hydraulic passage to the high clutch H/C under selection of R-range wherein the D-range pressure PD is not applied to the high clutch inhibitor valve 28.

As is mentioned hereinabove, when the switching solenoid 27 takes OFF position leading the hydraulic pressure from the dual purpose pressure adjusting valve 25 to the high clutch inhibitor valve 28, the switching valve 26 takes a position to permit feeding of the R-range pressure PR, which is produced when the R-range position is selected by the manual valve 20, to to the low & reverse brake L&R/B. Accordingly, the hydraulic pressure that is to be applied to the low & reverse brake L&R/B can be selected from the line pressure PL that has passed through the dual purpose pressure adjusting valve 25 (in case of the condition of FIG. 9) or the R-range pressure PR that has passed through the R-range pressure passage 34 (in case of the condition of FIG. 10). Accordingly, it is possible to detect undesirable stick phenomenon of the switching valve 26 that functions to avoid undesired interlocking and at the same time it is possible to reduce a necessary and maximum hydraulic pressure that is provided by the dual purpose pressure adjusting valve 25.

Furthermore, when, under movement of the vehicle with the R-range kept, the electric power is entirely shut down due to failure of the electric system or when the R-range is selected under failure of the electric power, both the low & reverse brake L&R/B and the reverse clutch REV/C become engaged as is understood from FIG. 10, and thus, as is seen from the table of FIG. 3, fixed reverse is established permitting backward movement of the vehicle.

In the following, advantages or advantageous features of the hydraulic control device of the present invention will be described.

(1) According to the present invention, there is provided a hydraulic control device of an automatic transmission, the transmission including a power train 6 having first and second rotation members (viz., first rotation member M1 and transmission input shaft 4) that are connectable to each other, the first rotation member being a member other than a transmission output member (viz., transmission output gear 5), the hydraulic control device comprising a solenoid valve (viz., dual purpose pressure adjusting valve 25) that provides a hydraulic pressure upon failure of electric power supply and controls the hydraulic pressure selectively applied to first and second frictional elements (viz., high clutch H/C and low & reverse brake L&R/B) using a hydraulic pressure (viz., line pressure PL), that has bypassed a manual valve 20, as a source pressure, the first and second frictional elements taking engaged positions at different range positions respectively; a first switching valve (viz., switching valve 26) that leads the hydraulic pressure from the solenoid valve to the first frictional element when a forward range position (viz., D-range position) is selected, and leads the hydraulic pressure from the solenoid valve to the second frictional element when a reverse range position (viz., R-range position) is selected; a hydraulic circuit that causes the first and second rotation members (viz., first rotation member M1 and transmission input shaft 4) to be connected to each other when the first frictional element is engaged; and a second switching valve (viz., high clutch inhibitor valve 28) that is arranged between the first switching valve and the first frictional element and uses a hydraulic pressure (viz., D-range pressure PD), which is provided when the forward range position is selected, as a signal pressure, wherein the second switching valve opens a communication between the solenoid valve and the first frictional element when the signal pressure is applied thereto and closes the communication between the solenoid valve and the first frictional element when the signal pressure is not applied thereto.

With the above-mentioned arrangement of the hydraulic control device, even when the ignition key cylinder is turned to OFF position during idling of the engine with N-range kept by the transmission, uncomfortable noise, which would be caused by a rapid engagement of the frictional element (or high clutch H/C), is suppressed. In addition to this advantageous feature, reduction in number of parts is achieved and movement of the vehicle is assured even when the electric power is entirely shut down.

(2) According to the present invention, there is further provided a hydraulic control device of an automatic transmission, the transmission including a power train 6 having first and second rotation members (viz., first rotation member M1 and transmission input shaft 4) that are connectable to each other, the first rotation member being a member other than a transmission output member (viz., transmission output gear 5), the hydraulic control device comprising a solenoid valve (viz., dual purpose pressure adjusting valve 25) that produces a hydraulic pressure upon failure of electric power supply and controls the hydraulic pressure selectively applied to first and second frictional elements (viz., high clutch H/C and low reverse brake L&R/B) using a hydraulic pressure (viz., line pressure PL), that has bypassed a manual valve 20, as a source pressure, the first and second frictional elements taking engaged positions at different range positions respectively; a first switching valve (viz., switching valve 26) that leads the hydraulic pressure from the solenoid valve to the first frictional element when a forward range position (viz., D-range position) is selected, and leads the hydraulic pressure from the solenoid valve to the second frictional element when a reverse range position (viz., R-range position) is selected; a hydraulic circuit that causes the first and second rotation members (viz., first rotation member M1 and transmission input shaft 4) to be connected to each other when the first frictional element is engaged; and a second switching valve (viz., high clutch inhibitor valve 28) that is arranged between the first switching valve and the first frictional element and uses a hydraulic pressure (viz., D-range pressure PD), which is provided when the forward range position is selected, as a signal pressure, wherein the second switching valve opens a communication between the solenoid valve and the first frictional element when the signal pressure is applied thereto and closes the communication between the solenoid valve and the first frictional element when the signal pressure is not applied thereto, and wherein when the first switching valve (or switching valve 26) takes a position to lead the hydraulic pressure from the solenoid valve (or dual purpose pressure adjusting valve 25) to the second switching valve (or high clutch inhibitor valve 28), the first switching valve opens a port through which a hydraulic pressure (or R-range pressure PR), which is provided when the manual valve 20 is shifted to a reverse range position (or R-range position), is led to the second frictional element (or low & reverse brake L&R/B).

Accordingly, the hydraulic pressure that is to be fed to the second frictional element (or low & reverse brake L&R/B) can be selected from the two hydraulic pressure passage systems. As a result, it is possible to detect a stick phenomenon of the first switching valve (or switching valve 26) that functions to avoid undesired interlocking and at the same time it is possible to reduce a necessary and maximum hydraulic pressure that is provided by the solenoid valve (or dual purpose pressure adjusting valve 25).

In the foregoing description, the hydraulic control device of an automatic transmission of the present invention is explained in detail with reference to the attached drawings. However, the concrete construction of the hydraulic control device is not limited to the above-mentioned one. That is, the concrete construction may change so long as it does not deviate from the scope of the invention.

In the above, an example has been described wherein the hydraulic control device of the present invention is practically applied to an automatic transmission of a type that has a first rotation member M1 other than the transmission output gear 5 that is connected with the transmission input shaft 4 when the to high clutch H/C as the first frictional element is engaged. However, as the first frictional element, any frictional element other than the high clutch H/C may be used. Furthermore, as the transmission output member, a transmission output shaft other than the transmission output gear 5 may be used. Furthermore, the first and second rotation members are not limited to the first rotation member M1 and the transmission input shaft 4. That is, such first and second rotation members may be other rotation members other than the transmission output member, that are connected to each other when the first frictional element becomes engaged.

In the above, an example has been described wherein the hydraulic control device of the present invention is applied to a four forward speeds and one reverse type automatic transmission AT mounted on a front engine and front drive motor vehicle. However, the motor vehicle to which the present invention is practically applied is not limited to the above-mentioned one. That is, the hydraulic control device of the present invention is widely applicable to various types of automatic transmission for a FF type (viz., front engine front drive type) motor vehicle, FR type (viz., front engine rear drive type) motor vehicle, hybrid type motor vehicle, etc. More specifically, the hydraulic control device of the invention is applicable to any type of automatic transmission so long as a power train of the transmission has a first member that is forced to rotate at a speed of the transmission input shaft when a first frictional element is engaged during idling of the engine with the transmission keeping N-range.

The entire contents of Japanese Patent Application 2009-029316 filed Feb. 12, 2009 are incorporated herein by reference.

Although the invention has been described above with reference to an embodiment of the invention, the invention is not limited to such embodiment as described above. Various modifications and variations of such embodiments may be carried out by those skilled in the art, in light of the above description.

What is claimed is:

1. A hydraulic control device of an automatic transmission, the transmission including first and second frictional elements that are respectively engaged at different range positions and first and second rotation members that are connected to each other when the first frictional element is engaged, the first and second rotation members being members other than a transmission output member, the hydraulic control device comprising:
   a solenoid valve that provides a hydraulic pressure upon failure of an electric power supply of the transmission and controls the hydraulic pressure selectively directed toward the first and second frictional elements by using a line pressure, that bypasses a manual valve, as a source pressure;
   a first switching valve that leads the hydraulic pressure is from the solenoid valve to the first frictional element when a forward range position is selected and leads the hydraulic pressure from the solenoid valve to the second frictional element when a reverse range position is selected;
   a second switching valve that is arranged between the first switching valve and the first frictional element, the second switching valve using a hydraulic pressure, which is provided when the forward range position is selected, as a signal pressure,
   wherein the second switching valve opens a fluid communication between the solenoid valve and the first frictional element through the first switching valve when applied with the signal pressure and closes the fluid communication with applied with no signal pressure.

2. A hydraulic control device of an automatic transmission as claimed in claim 1, in which when the first switching valve takes a position to lead the hydraulic pressure provided by the solenoid valve to the second switching valve, the first switching valve opens port through which a hydraulic pressure, that is provided by the manual valve when the reverse range position is selected, is led to the second frictional element.

3. A hydraulic control device of an automatic transmission as claimed in claim 1, in which the second switching valve uses D-range pressure, which is provided when the manual valve is shifted to D-range position, as the signal pressure, the manual valve being a valve actuated in accordance with an operational movement of a select lever manipulated by a driver.

4. A hydraulic control device of an automatic transmission as claimed in claim 3, in which the second rotation member is an input shaft of the transmission and in which the second frictional element is a member that selectively connects and disconnects the input shaft and the first rotation member.

5. A hydraulic control device of an automatic transmission, the transmission including first and second frictional elements that are respectively engaged at different range positions and first and second rotation members that are connected to each other when the first frictional element is engaged, the first and second rotation members being members other than a transmission output member, the hydraulic control device comprising:
   a manual valve through which line pressure is directed toward various frictional elements selectively when the transmission is in a proper working condition;
   a solenoid valve that provides a hydraulic pressure upon failure of an electric power supply of the transmission and controls the hydraulic pressure that is selectively directed toward the first and second frictional elements, the hydraulic pressure being the line pressure that bypasses the manual valve;
   a first switching valve that, upon selection of a forward range position, feeds the hydraulic pressure from the solenoid valve to the first frictional element and upon selection of a reverse range position, feeds the hydraulic pressure from the solenoid valve to the second frictional element; and
   a second switching valve arranged between the first switching valve and the first frictional element, the second switching valve using a hydraulic pressure, which is provided when the forward range position is selected, as a signal pressure,
   wherein the second switching valve opens a given fluid communication between the solenoid valve and the first frictional element through the first switching valve when applied with the signal pressure, and closes the given fluid communication when applied with no signal pressure.

6. A hydraulic control device of an automatic transmission as claimed in claim 5, in which when taking a position to lead the hydraulic pressure provided by the solenoid valve to the second switching valve, the first switching valve opens a port through which a hydraulic pressure, that is provided by the manual valve when the reverse range position is selected, is led to the second frictional element.

7. A hydraulic control device of an automatic transmission, the transmission including a clutch and a brake that are respectively engaged at different range positions and a first rotation member other than a transmission output member and a transmission input shaft that are connected to each other when the clutch is engaged, the hydraulic control device comprising:

a dual purpose pressure adjusting valve that provides a hydraulic pressure upon failure of electric power supply of the transmission and controls the hydraulic pressure selectively directed toward the clutch and brake by using a line pressure, that bypasses a manual valve, as a source pressure;

a switching valve that leads the hydraulic pressure from the dual purpose pressure adjusting valve to the clutch when D-range position is selected and leads the hydraulic pressure from the dual purpose pressure adjusting valve to the brake when R-range position is selected; and a clutch inhibitor valve that is arranged between the switching valve and the clutch, the clutch inhibitor valve using a hydraulic pressure, which is provided when the D-range position is selected, as a signal pressure, wherein the clutch inhibitor valve opens a given fluid communication between the dual purpose pressure adjusting valve and the clutch through the switching valve when applied with the signal pressure and closes the given fluid communication when applied with no signal pressure.

* * * * *